Aug. 31, 1965  W. HOFMANN  3,203,331
DIAPHRAGM FOR PHOTOGRAPHIC CAMERAS
Filed Nov. 14, 1961  4 Sheets-Sheet 1

INVENTOR.
WILFRIED HOFMANN

Aug. 31, 1965    W. HOFMANN    3,203,331
DIAPHRAGM FOR PHOTOGRAPHIC CAMERAS
Filed Nov. 14, 1961    4 Sheets-Sheet 2

Fig.3

INVENTOR.
WILFRIED HOFMANN
BY Michael S. Striker

Aug. 31, 1965   W. HOFMANN   3,203,331
DIAPHRAGM FOR PHOTOGRAPHIC CAMERAS
Filed Nov. 14, 1961   4 Sheets-Sheet 3

Fig. 4

INVENTOR.
WILFRIED HOFMANN
BY Michael S. Striker

United States Patent Office 3,203,331
Patented Aug. 31, 1965

3,203,331
DIAPHRAGM FOR PHOTOGRAPHIC CAMERAS
Wilfried Hofmann, Munich, Germany, assignor to Agfa
Aktiengesellschaft, Leverkusen-Bayerwerk, Germany
Filed Nov. 14, 1961, Ser. No. 152,293
Claims priority, application Germany, Nov. 24, 1960,
A 36,110
9 Claims. (Cl. 95—64)

The present invention relates to cameras.

More particularly, the present invention relates to diaphragms of photographic cameras.

The diaphragms of modern photographic cameras which are, for example, both fully automatic or, at the option of the operator, partly automatic, are required to fulfill a number of requirements which are not satisfactorily fulfilled by conventional diaphragms.

For example, with cameras which are capable of being operated automatically or semi-automatically, it is necessary that the diaphragm be capable of being set in a fully automatic manner by the structure which responds to the lighting conditions, and this requires that the diaphragm be constructed according to the characteristics of the structure which responds to the lighting conditions. Thus, if the camera is to avoid having complex transmissions, the elements which set the diaphragm and the exposure time are required to turn in the same direction. However, the characteristics of the turning of these elements to set the diaphragm and the shutter need not be linearized. On the other hand, when the camera is operated in a semi-automatic manner, it is necessary that the element which sets the diaphragm turn in a direction opposite to that which sets the shutter, and the scales which are used during such manual setting must be linearized. Moreover, where the structure which automatically sets the camera provides a simultaneous setting of the exposure time and the exposure aperture, the automatic diaphragm setting structure and the manual diaphragm setting structure must turn through different angles in order to provide a full range of operation of the diaphragm setting structure between its limits of operation.

If, moreover, a camera which is capable of providing a fully automatic operation according to the lighting conditions is also required to provide operation with flash illumination, then it is necessary to be able to operate the diaphragm by coupling it, at the option of the operator, to the focussing ring of the camera during operation with flash illumination or, when the camera is operated automatically according to the lighting conditions, it is necessary to control the diaphragm from the structure which responds to the lighting conditions, and in this case also the focussing structure and the structure which responds to the lighting conditions have entirely different characteristics of movement to which the same diaphragm structure must accurately respond.

Moreover, if, in a camera in which the shutter is capable of being set in a fully automatic manner, there is also provided a selection of the depth of field, then in this case also it is required that the diaphragm be operable on the one hand according to the movement characteristics of the structure which sets the selected depth of field, while on the other hand, in order that the range of operation of the camera not be unnessarily limited, the possibility of further setting the diaphragm after the exposure time has been adjusted through its entire range is also desired, and in this case the structure which will automatically operate the diaphragm has a characteristic of operation which differs sharply from that which sets the selected depth of field.

It is accordingly a primary object of the present invention to provide a camera with a diaphragm structure which is capable of fulfilling the above requirements.

Moreover, it is an object of the present invention to provide a diaphragm of an exceedingly simple construction which can nevertheless fulfill the above requirements while at the same time eliminating the necessity for any complex transmissions or the like.

Yet another object of the present invention is to provide a diaphragm assembly which in and of itself is capable of being operated in two entirely different ways providing at least two entirely different types of diaphragm operation.

Furthermore, it is an object of the present invention to provide an exceedingly compact diaphragm assembly capable of being coupled to at least a pair of different operating structures for providing different types of diaphragm operation.

With the above objects in view the invention includes, in a camera, a pair of rotary diaphragm rings and a plurality of diaphragm blades located therebetween. Each of these blades carries a pair of pins which are respectively received in slots of the pair of diaphragm rings, and the slots of one of the rings have a curvature different from the slots of the other of the rings, so that when one of the rings turns with respect to the other one type of diaphragm operation will be provided while when the other of the rings turns with respect to the said one ring a different type of diaphragm operation will be provided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

In all of the embodiments of the invention described below and shown in the drawings, there are a pair of rotary diaphragm rings and a plurality of diaphragm blades located therebetween, but for the sake of clarity of illustration only one diaphragm blade is illustrated together with the structure which cooperates therewith. Of course, the structure described below and shown in the drawings cooperating with one of the blades of the diaphragm is repeated for each of the blades thereof.

Figure 1:
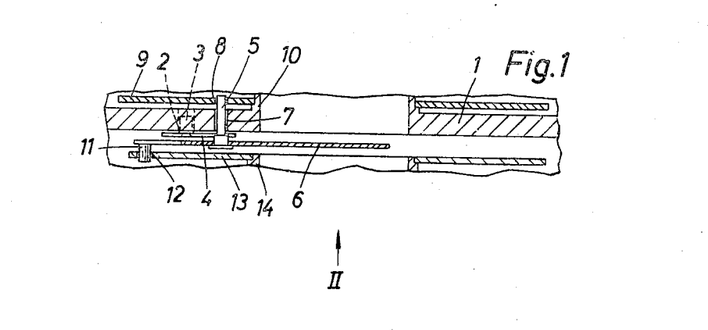
FIG. 1 shows in a fragmentary sectional view a diaphragm according to the present invention, the section of FIG. 1 being taken in a plane which includes the optical axis.
Figure 2:
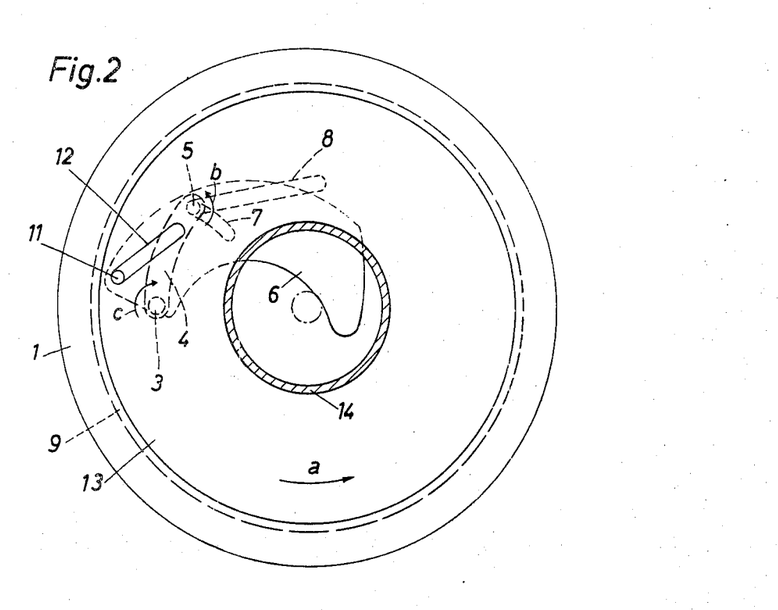
FIG. 2 is an elevation of the diaphragm of FIG. 1 as seen when looking toward the structure of FIG. 1 in the direction of the arrow II of FIG. 1.

Referring to FIGS. 1 and 2, the diaphragm of the invention illustrated therein includes a stationary plate 1 which surrounds the optical axis. For each of the diaphragm blades, this plate 1 is formed with a bore 2 which receives a pivot pin 3 which is fixed to a lever 4 so that this lever 4 is turnable about the axis of the bore 2, this axis extending parallel to the optical axis. At its end distant from the bore 2 the lever 4 carries a pin 5 which extends through an arcuate slot 7 whose center is in the axis of the bore 2, and this pin 5 extends through the slot 7 to the side of the plate 1 opposite from that on which the lever 4 is located. At this side of the plate 1 opposite from the lever 4 there is located one of the rotary diaphragm rings 9 of the diaphragm of the invention. As is apparent particularly from FIG. 1, the pin 5 extends beyond the lever 4 toward the other diaphragm ring 13, and at its portion between the lever 4 and the diaphragm ring 13 the pin 5 extends through a bore or opening formed in the diaphragm blade 6 so that in this way the blade 6 is carried by the pin 5 to move therewith as well as to turn with respect thereto, as pointed out below. The free end of the pin 5 which is distant from the blade 6 extends into an elongated slot 8 formed in the diaphragm ring 9. A tubular extension 10 of the plate 1 supports at its outer surface the diaphragm ring 9 for rotary movement about the optical axis. Thus, the pin 5 and the slot 8 provide a pin-and-slot connection between the diaphragm blade 6 and the diaphragm ring 9.

The diaphragm blade 6 also carries a pin 11 which extends into a slot 12 formed in the rotary diaphragm ring 13, and thus elements 11 and 12 provide a pin-and-slot connection between the diaphragm blade 6 and the rotary diaphragm ring 13. The rotary diaphragm ring 13 is supported for rotary movement about the optical axis by a stationary tubular member 14 which is fixed, in an unillustrated manner, to the stationary plate 1.

The parts are shown in FIG. 2 in a position where the diaphragm provides the smallest aperture. If, with the parts in this particular position, the ring 13 is turned in the direction of the arrow $a$ of FIG. 2, the slot 12 will cam the pin 11 inwardly toward the optical axis so that at this time the blade 6 will turn in the direction of the arrow $b$ outwardly away from the optical axis and thus the aperture will increase. When the end of the slot 12 which is nearest to the optical axis reaches the pin 11 the diaphragm will have been placed in the position providing the largest aperture. It should be noted that the distance between the pins 5 and 3 is equal to the distance between the pins 5 and 11. Therefore, when the innermost end of the slot 12, the end nearest to the optical axis, reaches the pin 11, this pin will be in precise coincidence with the pin 3 so that the pins 11 and 3, when the diaphragm is at its position providing the largest aperture have a common axis. It will be noted that the inner end of the slot 12 and the pin 3 are located at the same radial distance from the optical axis. Therefore, the pin-and-slot connection 11, 12 enables the blade 6 to turn about the pin 5 as a pivot while the blade 6 turns in the direction of the arrow $b$ until the pin 11 has its axis coincide with that of the pin 3, and in this position the largest aperture is provided.

From this position where the largest aperture is provided by the diaphragm of the invention, the ring 13 can of course be turned in a direction opposite to that indicated by the arrow $a$ so as to again provide the smallest aperture. However, instead of turning the ring 13 for this purpose, it is also possible to move the blades 6 inwardly toward the optical axis by turning the ring 9, and this ring 9 for this purpose may, for example, be turned in the direction of the arrow $a$. Thus, referring to FIG. 2 and assuming that the diaphragm is in the position providing the largest aperture with the inner end of the slot 12 engaging the pin 11 and with this pin 11 coinciding with the pin 3, if the ring 9 is turned in the direction of the arrow $a$, then the slot 8 will cooperate with the pin 5 to advance this pin 5 inwardly toward the optical axis, and at this time the lever 4 will of course turn in the direction of the arrow $c$, and it will be noted that the blade 6 can at this time turn about the pin 11, so that while the pin-and-slot connection 5, 8 acts to move the diaphragm blade 6 the other pin-and-slot connection 11, 12 serves as a pivot for the blade 6. In this way the pin-and-slot connections of each diaphragm blade 6 to the pair of rotary diaphragm rings 9 and 13 alternately provide pivotal supports for each diaphragm blade so that when one of the pin-and-slot connections is actuated to change the size of the diaphragm aperture the other pin-and-slot connection provides the pivotal support for the diaphragm blade. It will be noted that the slots 8 and 12 can have widely different shapes so that it is possible to operate the diaphragm in one way by turning of one of the diaphragm rings and in an entirely different way by operating the other of the diaphragm rings. Thus, the diaphragm may be moved from the position shown in FIG. 2 to its fully open position by turning the ring 13 in the direction of the arrow $a$, and then the ring 9 may be turned in the direction of the arrow $a$ so as to close the diaphragm or bring it to its position where it provides the smallest aperture. During the turning of the diaphragm blade 6 at this time about the common axis of the pins 11 and 3 in the direction of the arrow $c$, the pin 5 is cammed by the slot 8 along the arcuate slot 7 of the plate 1 toward the optical axis, so that the lever 4 also turns at this time in the direction of the arrow $c$ of FIG. 2.

Because of the configuration of the slot 8, it is possible also to reduce the size of the aperture of the diaphragm, when it is in its largest aperture position with the inner end of the slot 12 engaging the pin 11 and the pin 11 aligned with the pin 3, by turning the ring 9 in the direction indicated by the arrow $a$ in FIG. 2. Of course, it is possible to turn the ring 9 to a position which will provide an intermediate aperture between the largest and smallest apertures of the diaphragm, and assuming that the ring 9 has been turned in this way to provide an intermediate aperture, it is then possible to continue the reduction in the size of the aperture by way of the ring 13. Thus assuming that the ring 9, for example, has under the above conditions turned the diaphragm blade 6 from its position providing the largest aperture to an intermediate position, then of course the pin 5 will be located between the ends of the slot 7 and the ring 13 can at this time be turned in a direction opposite to that indicated by the arrow $a$ so that the slot 12 will cam the pin 11 away from the optical axis to continue the closing of the diaphragm, and the blade 6 will at this time turn about the pin 5 as a pivot in a direction opposite to that indicated by the arrow $b$ in FIG. 2, and because the pin 5 is located at the intersection between the slots 7 and 8, this pin 5 will remain stationary in the position providing a pivotal support for the blade 6 at this time.

Thus, with the structure of FIGS. 1 and 2 described above, it is possible to move the diaphragm blades from their position providing the largest aperture toward their position providing the smallest aperture either by turning the rings 9 and 13 in opposite directions or in the same direction. Moreover, by selecting particular curvatures, inclinations, and lengths of the slots 8 and 12 it is possible to provide for the pair of diaphragms rings a pair of entirely different operating or adjusting characteristics. Moreover, it is possible also to move the diaphragm throughout its entire range of movement with one of the pair of diaphragm rings turning through an angular distance substantially different from that through which the other ring turns to provide the same range of operation of the diaphragm.

Figure 3:
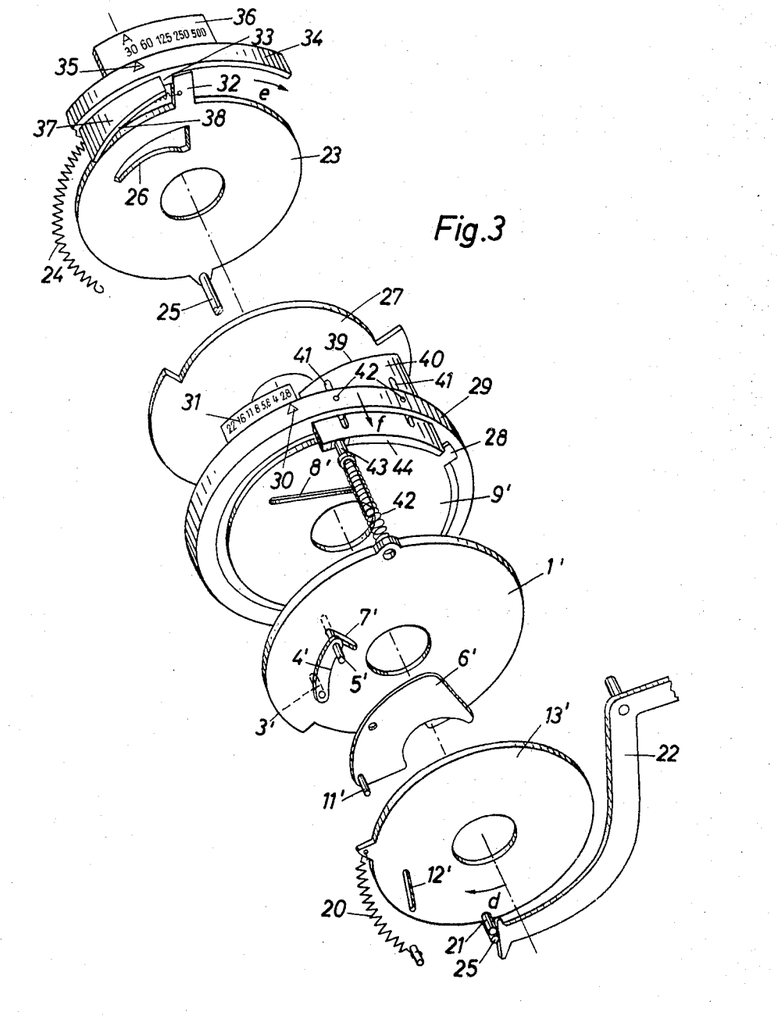
FIG. 3 is a perspective, exploded illustration of the diaphragm of the invention used in a camera which is optionally either fully automatic or semi-automatic.

In the embodiment of the invention which is illustrated in FIG. 3, those parts of the diaphragm which correspond to those of FIGS. 1 and 2 are indicated by the same reference characters primed. Thus, the diaphragm of FIG. 3 includes a rotary diaphragm ring 13' which is urged to turn in a direction opposite to that indicated by the arrow d by a spring 20 which urges a pin 21 carried by the diaphragm ring 13' into engagement with the free end of a lever 22. The lever 22 forms part of a transmission from a scanning element of an automatic light-responsive means which is capable, in a well-known way, of turning the lever 22 through an angle determined by the lighting conditions, and during automatic setting of the diaphragm the lever 22 turns so as to turn, through engagement with the pin 21, the ring 13' in the direction of the arrow d. Coaxial with the diaphragm ring 13' is a rotary exposure time setting ring 23 which is acted upon by a return spring 24 which yieldably maintains a pin 25, which is fixed to the ring 23 and extends parallel to the optical axis, in engagement with the end of the lever 22, so that when this lever 22 turns in order to automatically set the camera, the rings 23 and 13 will simultaneously turn so as to simultaneously set the aperture and exposure time. The exposure time setting ring 23 is formed with an opening one edge 26 of which forms a camming edge which in a well-known way cooperates with a pin of a lever of a conventional retarding mechanism so as to set this retarding mechanism, in accordance with the angular position of the ring 23, to provide an adjustment of the exposure time.

The diaphragm ring 13' is formed with a plurality of slots 12' equal to the number of diaphragm blades 6' and distributed about the optical axis, these slots 12' respectively receiving the pins 11' which are respectively fixed to the blades 6'. Each of the blades 6' is turnably carried by the pin 5' which is fixed to the lever 4', and each lever 4' is pivotally carried at 3' by the stationary plate 1'. The pin 5' extends through the arcuate slot 7' to the side of the plate 1' opposite from the blades 6', and at this opposite side of the plate 1' each pin 5' extends into a slot 8' formed in the rotary diaphragm ring 9'.

The diaphragm ring 9' of FIG. 3 is provided at its outer periphery with a radial projection 28 which extends into a cutout formed in a rotary, manually operable ring 29 so that the ring 9' is constrained to turn with the ring 29. The ring 29 forms a manually operable means for manually setting the diaphragm, so that it will be seen that with the structure of FIG. 3 the ring 29 may be operated for manually setting the diaphragm while the ring 13' will be automatically operated for automatically setting the diaphragm, and because of the differences between the slots 8' and 12' the type of diaphragm operation provided during manual operation will be adapted exactly to the best possible operation required for manual setting of the diaphragm while the type of operation provided during automatic operation will, by way of the slot 12', be of a type providing the best possible diaphragm operation when it is automatically set. The ring 29 carries an index 30 which cooperates with a scale 31 of aperture sizes, this scale 31 being stationary and carried by any suitable part of the camera.

The exposure time setting ring 23 is provided also with a radial projection 32, and this radial projection 32 engages a shoulder or step 33 formed at the inner surface of a manually turnable exposure time setting ring 34, so that when this ring 34 is turned in the direction of the arrow e the ring 23 will be turned for manually setting the exposure time. It will be noted that with this construction it is possible for the lever 22 to act on the pin 25 to turn the ring 23 in the direction of the arrow e in opposition to the spring 24 while the ring 34 remains stationary, since the projection 32 can simply move away from the shoulder 33 in the direction of the arrow e. On the other hand, since the projection 28 of the ring 9' extends into a cutout of the ring 29 which substantially mates with the configuration of the projection 28, the ring 9' will turn with the ring 29 irrespective of the direction in which the ring 29 is turned by the operator. The exposure time setting ring 34 is provided with an index 35 cooperating with a scale 36 of exposure times, and it will be noted that this scale also includes a symbol A indicating the position of the index 35 for automatic operation of the camera.

A curved plate 37, which forms part of a cylinder whose axis coincides with the optical axis, is fixed to the ring 34 and has an edge 38 which is inclined in the manner shown in FIG. 3. This edge 38 engages a corresponding edge 39 of a curved plate 40 which forms part of the same cylinder as that of which the plate 37 forms a part, and this plate 40 extends through an arcuate slot in the ring 29 so that the plate 40 is shiftable along the optical axis. In order to be guided for movement in this direction the plate 40 is formed with a pair of longitudinal slots 41, extending parallel to the optical axis, and receiving pins 42 which are fixed to the ring 29, so that in this way the plate 40 can shift back and forth along the optical axis. Thus, when the ring 34 is turned in the direction of the arrow e, the edge 38 of the plate 37 will slide along the edge 39 of the plate 40 to shift this plate 40 axially, and in the same way when the ring 29 is turned to move the index 30 along the scale 31 the plate 40 by cooperating at its edge 39 with the edge 38 of the plate 37 will shift axially. Thus, the axial position of the plate 40 will at all times provide an indication of the combination of the exposure time and exposure aperture which have been manaully set into the camera. The plates 37 and 40 thus cooperate to provide a totalizing means capable of totalizing the combination of exposure time and exposure aperture during manual setting of these exposure factors, so that for any given light value the plate 40 will have the same position irrespective of the combination of exposure time and exposure aperture which have been manually set into the camera. At its end distant from its inclinded edge 39, the plate 40 is provided with an edge 44 located in a plane normal to the optical axis, and a spring 42 presses at one end against the stationary plate 1' and at its opposite end against a collar which is fixed to a pin 43 so that this pin 43 bears at all times against the edge 44 of the plate 40, and it will be noted that this spring 42 also acts through the pin 43 on the plate 40 for maintaining the edge 39 at all times in engagement with the edge 38. This pin 43 is connected in a known way through an unillustrated transmission with a pointer which is visible to the operator and which is capable of being aligned, by manual setting of the exposure time and exposure aperture, with the pointer of the light meter, so that when the pointer controlled by the axial position of the pin 43 is in alignment with the pointer of the light meter the operator knows that the camera has been set to make a proper exposure.

In order to provide, with the structure of FIG. 3, a fully automatic operation of the camera, the rings 29 and 34 are manually turned to the positions indicated in FIG. 3 where the index 30 of the ring 29 and the index 35 of the ring 34 are in alignment with the symbol A of the scale 36. Now the operator, in a known manner, releases the automatic light-responsive structure so that the scanning element thereof moves into engagement with the pointer of the light meter, and through an unillustrated transmission the lever 22 is turned accordingly and acts on the pins 21 and 25 for simultaneously turning the rings 13' and 23 in the direction of the arrow d, so as to automatically set the aperture and the exposure time. During this automatic operation the ring 9' of course remains stationary, and thus the diaphragm is set by rotary movement of the ring 13' with respect to the ring 9', and at this time the slots 12' respectively cooperate with the pins 11' to turn the blades 6' to provide an exposure aperture which is automatically determined. Of course, the exposure time is automatically set simultaneously with the exposure aperture. After the structure has automatically set the camera the operator releases the shutter to make the exposure.

Upon release of the automatic light-responsive structure, the parts return to their positions indicated in FIG. 3, the springs 20 and 24 acting at this time on the rings 13' and 23 to return these rings to their starting positions indicated in FIG. 3. Of course the position of the shoulder 33 determines the starting position of the ring 23, and the engagement of the scanning structure with a suitable stop will determine the position of the lever 22 so that the position of the pin 21 will be determined so as to determine the starting position of the ring 13', but at this time the upper end of the slot 12' as viewed in FIG. 3, will engage the pin 11' so that the position of the ring 13' is also determined in this way, the diaphragm providing the largest aperture in the starting position of the ring 13' with the particular example illustrated in FIG. 3.

During semi-automatic operation, in the manner described above, the exposure time may be set first, for example, and for this purpose the operator will manually turn the ring 34 in the direction of the arrow e until the index 35 is aligned with the graduation of the scale 36 which provides the selected exposure time. The shoulder 33 cooperates with the projection 32 in order to turn the ring 23 in opposition to the spring 24 and any suitable releasable detent structure, well-known in the art, is provided to retain the ring 23 in the manually selected angular position in opposition to the spring 24 until the operator again moves the ring 34. Thus, the ring 23 will be turned manually at this time to provide the selected exposure time. It will be noted that during this turning of the ring 34 the surface 38 of the plate 37 cooperates with the surface 39 of the plate 40 so as to axially move this plate 40 and shift this plate in the direction of the arrow f, so that in this way the movement is transmitted through the pin 43 in the manner described above to the pointer which is visible to the operator and which is to be aligned with the exposure meter pointer.

After setting the exposure time in this way the operator turns the ring 29 for setting the aperture, and the ring 29 will be turned in a direction opposite to that indicated by the arrow e. The surface 39 of the plate 40 will now move relative to the surface 38 so as to reset the axial position of the plate 40, and it will be noted that the ring 29 turns from the position shown in FIG. 3 in a direction opposite to that in which the operator turns the ring 34 from the position shown in FIG. 3, so that the plate 40 continues to move in the direction of the arrow f during setting of the exposure aperture by way of the ring 29. The operator continues to set the diaphragm manually by way of the ring 29 until the pointer which is actuated by axial movement of the pin 43 is aligned with the pointer of the light meter. Of course, at this time the slot 8' co-operates with the pin 5' so that the diaphragm blades turn about the pivots which are now provided by the pins 11'. If, after setting the camera manually in this way, it is found, for example, that the diaphragm aperture, indicated on the scale 31, does not provide the desired depth of field, for example, then the operator may manually turn the rings 29 and 34 simultaneously without providing any relative turning therebetween so that the pointer which is actuated by the pin 43 will remain in alignment with the light meter pointer while at the same time the operator can change the combination of the exposure time and exposure aperture to provide, for example, a smaller aperture which will thus give a larger depth of field.

Figure 4:
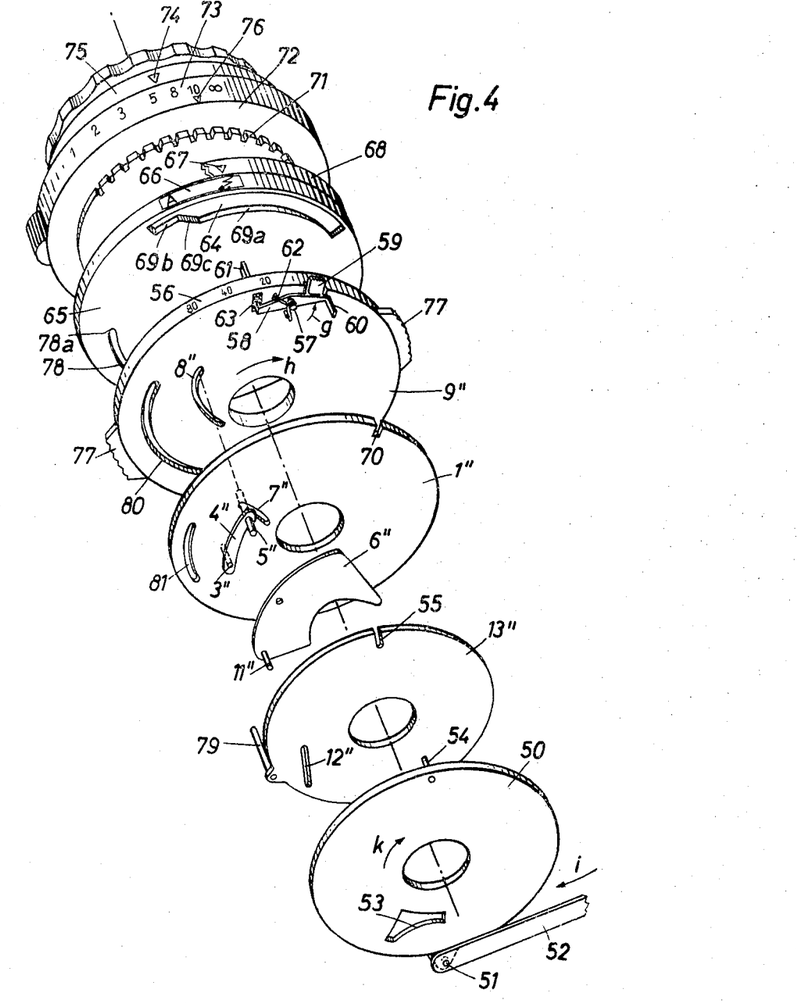
FIG. 4 is a perspective exploded illustration of a diaphragm according to the invention incorporated into a camera capable of providing fully automatic operation or operation under flash illumination.

In the embodiment of the invention which is illustrated in FIG. 4, those parts which correspond to the diaphragm described above in FIGS. 1 and 2 are designated by the same reference characters double primed. Thus, referring to FIG. 4, the structure illustrated therein includes a rotary exposure time setting ring 50, shown at the lower part of FIG. 4, and a pin 51 is fixed to the ring 50 and extends into an opening of the lever 52 which is actuated by the automatic light-responsive structure, so that in this way during movement of the lever or bar 52 the ring 50 will be turned to set the exposure time. For this purpose the ring 50 is formed with a cutout having a camming edge 53 which cooperates with the unillustrated pin on the lever of the retarding mechanism to set this retarding mechanism to provide an exposure time according to the angular position of the ring 50. The bar 52 will of course be shifted by a suitable transmission to the scanning element which scans the position of the light meter pointer, in a well-known manner. Moreover, the rotary exposure time setting ring 50 carries a pin 54 which extends parallel to the optical axis and which is received in a slot 55 of the ring 13" which is again formed with a plurality of camming slots 12" equal to the number of diaphragm blades and receiving the pins 11" of the diaphragm blades 6", respectively. Thus, it will be seen that the ring 13" is constrained to turn with the ring 50. The blades 6" of the diaphragm are again each turnably carried by a pin 5" carried in turn by a lever 4" which is pivotally carried at 3" by the stationary plate 1", this plate 1" being formed with an arcuate slot 7" for each pin 5", and each pin 5" extends through the slot 7" to be received into the slot 8" of the other rotary diaphragm ring 9". In the embodiment of FIG. 4 the ring 9" is also capable of being manually turned, and for this purpose it has manually engageable portions 77. Moreover, the ring 9" carries at its periphery a scale 56 of flash guide numbers used when operating with flash illumination.

The ring 9" of the embodiment of FIG. 4 fixedly carries a pin 57 which extends parallel to the optical axis and which supports for turning movement a lock lever 58 having at one end a projection 60 extending parallel to the optical axis in one direction and at its opposite end a projection 61 extending parallel to the optical axis in an opposite direction. The lever 58 has a manually engageable portion 59 extending outwardly beyond the periphery of the ring 9" so as to be accessible to the operator. A wire spring 62 is coiled about the pin 57, has one free end engaging a pin which is fixed to the ring 9" and has an opposite free end engaging the upper edge of the lever 58, as viewed in FIG. 4, for urging this lever to turn in the direction of the arrow g shown in FIG. 4.

The projection 61 extends through an elongated slot 63 formed in the ring 9", and the opposite ends of the slot 63 determine the range of turning of the lever 58. The projection 61 extends through an elongated arcuate opening 64 formed in a manually turnable control ring 65 which is turned by the operator to provide a selected type of operation, and this rotary control ring 65 is located adjacent and is parallel to the ring 9". The manually turnable ring 65 carries a scale 66 having a symbol for automatic operation and a symbol for operation with flash illumination. The scale 66 cooperates with a stationary index 67 carried by a stationary part 68 of the camera.

The opening 64 of the control ring 65 is provided with control surfaces 69a, 69b, and 69c which extends between the surfaces 69a and 69b, and these surfaces cooperate with the projection 61 for determining the angular position of the lever 58 in accordance with the selected angular position of the ring 65. When the projection 61 engages the surface 69a, and this is the position shown in FIG. 4, then the spring 62 acts on the lever 58 for turning it to one of its end positions where the projection 60 is located at the greater distance from the optical axis. On the other hand, if the ring 65 is turned so as to align the symbol A with the index 67, then the inclined portion 69c of the ring 65 engages the projection 61 to move it away from the optical axis and this projection will engage the portion 69b of the ring 65 when the symbol A is aligned with the index 67, and at this time the ring 65 will have located the lever 58 in its opposite end position where the projection 60 is closest to the optical axis. In this latter position of the lever 58 the projection 60 is received within a notch 70 which is formed in the stationary diaphragm plate 1", so that of course at this time the ring 9" will be restrained against turning movement.

The outer free end of the projection 61 is located in the same plane as a plurality of teeth 71 which are fixed to the focussing ring 72 which is turned in a well-known manner by the operator so as to set the objective in accordance with the distance between the subject and the focal plane. Thus, with the parts in the position of FIG. 4 where the position of projection 61 is determined by the surface 69a, the projection 60 is located beyond the notch 70 and the projection 61 can enter into the space between a pair of the teeth 71 for releasably locking the ring 9" to the focussing ring 72. Thus, during operation with flash illumination the ring 9" will turn with the ring 72 for automatically adjusting the exposure aperture with changes in the setting of the ring 72 which sets the distance from the subject to the camera, while when the camera is set for automatic operation the ring 9" will remain stationary and instead the automatic light-responsive structure will turn the ring 13" for automatically setting the aperture. Of course, when the edge portion 69b of the opening 64 engages the projection 61, this projection 61 is located beyond the teeth 71 so that the connection between the ring 9" and the focussing ring 72 is now eliminated.

In order to set the ring 72, it carries a scale 73 of distances between the subject and the camera, and this scale 73 cooperates with a stationary index 74 carried by stationary ring 75. Moveover, the scale 73 carries an index 76 with which the selected guide number of the scale 56 is adapted to be aligned when operating the camera according to flash illumination.

In order to make an exposure with automatic control of the camera, the ring 65 is turned by the operator in the direction of the arrow h, and thus the portions 69c and 69b of the opening 64 will engage the projection 61 to move this projection to its end position furthest from the optical axis, so that the projection 60 will enter into the notch 70. Of course, the periphery of the ring 9" is provided with a suitable symbol such as a symbol A which may be aligned with the index 67, for example, to indicate the proper angular position of the ring 9" for automatic operation of the camera. It should be noted that if the operator turns the ring 65 in the direction of the arrow h and the ring 9" is not in the proper position for automatic operation, then the inclined edge 69c will engage the projection 61 to place the projection 60 in engagement with the periphery of the stationary ring 1", and the operator will feel this resistance to the turning of the lever 58 and will turn the ring 9", the projection 61 being at this time located beyond the teeth 71, until the projection 60 enters into the notch 70, and then the operator can turn the ring 65 to align the symbol A with the index 67.

The automatic light-responsive structure is now released for operation in order to shift the bar 52 in the direction of the arrow i in accordance with the lighting conditions, and the result is that the ring 50 turns in the direction of the arrow k in order to set the exposure time by way of the edge 53 in the opening of the ring 50, and because of the pin-and-slot connection 54, 55 the ring 13" turns with the ring 50 so that the blades 6" of the diaphragm will be turned in the manner described above to provide an automatic setting of the aperture simultaneously with the automatic setting of the exposure time. Of course, at this time the ring 9" remains stationary because it is locked by the lever 58 to the stationary plate 1".

After the exposure is made the bar 52 is returned by an unillustrated spring structure, for example, to its initial position and this will return the rings 50 and 13' to their initial positions in a direction opposite to that indicated by the arrow k.

In order to make an exposure with flash illumination, the ring 65 is first turned so that the flash symbol of the scale 66 is aligned with the index 67, and the turning of the ring 65 in this way will release the lever 58 to the spring 62 which moves the projection 60 out of the notch 70. Simultaneously the projection 61 enters into the space between a pair of teeth 71, or is positioned to enter into such a space after a very slight turning of the ring 72. Then the operator depresses the manually engageable portion 59 of the lever 58 so as to release the connection between the ring 9" and the ring 72 without, of course, providing any connection between the ring 9" and the stationary ring 1", and with the lock lever 58 thus manually maintained out of a locking position either with the ring 1" or the teeth 71 the operator turns the ring 9" until the selected guide number of the scale 56 is aligned with the index 76. Thus, when the operator releases the lever 58 it will automatically provide a connection of the ring 9" to the ring 72 in accordance with the selected guide number. Now the ring 72 can be turned to focus the camera on the subject, the scale 73 cooperating with the index 74 at this time, and a shortening of the distance between the camera and the subject by way of the ring 72 will result in turning of the ring 9" in a direction, indicated by the arrow h in FIG. 4, which will reduce the size of the exposure aperture.

The manually operable control ring 65 is provided with an arcuate slot 78 which when the ring 65 is set in the angular position for flash operation has its end 78a in engagement with the pin 79 which is fixed to and extends from the ring 13" in a direction parallel to the optical axis. The plates 1" and 9" are provided with cutouts 81 and 80 through which the pin 79 passes into the slot 78, and of course the size of the arcuate cutouts 78, 80 and 81 is such that all of the rings can turn through the desired range without any interference encountered by engagement of pin 79 with any of the turnable rings or with the ends of the slot 81 of the stationary plate 1". Thus, when the operator turns the control ring 65 to the position for operation with flash illumination, the end 78a of the slot 78 will engage the pin 79 so as to provide for the operator an indication of the limit of the turning of the ring 65 for the purpose of setting the camera for flash illumination.

Figure 5:
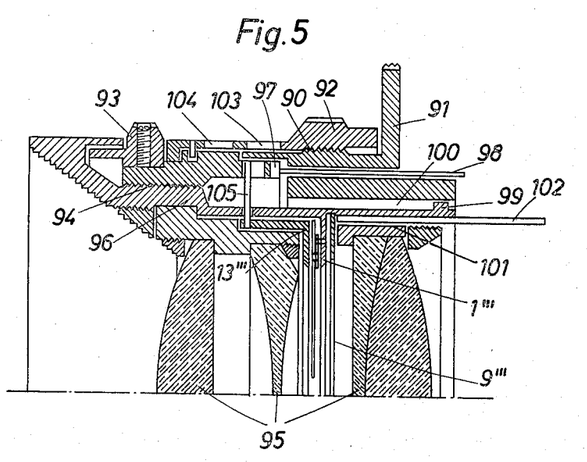
FIG. 5 is a fragmentary sectional elevation of a camera which includes the diaphragm of the invention and which provides automatic operation together with selection of the depth of field.

Coming now to the embodiment of the invention which is illustrated in FIG. 5, here again those parts of the diaphragm of the invention which correspond to those of FIGS. 1 and 2 are indicated by the same reference characters triple primed. In the embodiment of FIG. 5 there is a stationary carrier 91 having a threaded tubular portion 90 which threadedly carries a ring 92 for setting the objective according to the distance between the subject and the camera. Moreover, there is a second manually adjustable ring 93 which also is capable of being set according to the distance between the subject and the camera, and this ring 93 is connected through the threads 94, the pitch of which is one half that of the threads 90 and the direction of which is opposite to that of the threads 90, to the tube 96 which carries the lenses 95 of the objective. Thus, for example, if the threads 90 are right hand threads, then the threads 94 are left hand threads, and their pitch is of course one half that of the threads 90, and while the ring 92 is turnable by way of the threads 90 on the stationary member 91, the ring 93 is turnable by way of the threads 94 on the tube 96 which carries the lenses 95 of the objective. The ring 92 is fixed with a cylinder formed with the openings 103 and 104, referred to below, and terminating at its left end, as viewed in FIG. 5 in an inwardly directed flange extending into a groove or annular space formed in part of the ring 93, so that while the ring 92 is turnable with respect to the ring 93, and the ring 93 is turnable with respect to the ring 92, nevertheless the rings 92 and 93 are constrained to shift together along the optical axis. Therefore, when the ring 92 is turned the ring 93 together with the tube 96 will move axially with the ring 92, while when the ring 93 is turned only the tube 96 will move along the optical axis. The tube 96 carries a projection 99 extending into an axial groove 100 of the stationary carrier 91, so that in this way the tube 96 cannot turn and can only move back and forth along the optical axis.

The ring 93 is formed with an axial slot of the same width as and slidably receiving a pin 105 which is operatively connected with the rotary diaphragm ring 13''', this pin 105 extending from the ring 93 through an arcuate slot formed in the tube 96 into an opening of a projection of the ring 13''', and the arcuate slot in the tube 96 is long enough to provide the desired range of turning of the diaphragm ring 13''' in response to turning of the ring 93 about the optical axis. Moreover, the ring 93 has a forwardly directed edge portion 97 which has a configuration which will advance the elongated pin 98 which is supported for longitudinal movement, parallel to the optical axis, in a suitable opening formed in the stationary carrier 91. The curvature of the control surface 97 of the ring 93 is such that the axial position of the pin 98 will correspond to the angular position of the ring 93, and this pin 98 is operatively connected in a known manner to the light meter for angularly turning the light meter to an angular position which compensates for the diaphragm aperture which is preselected by way of the angular position of the ring 93 as well as the ring 92, this ring 92 due to its axial movement of the ring 93 also influencing the position of the pin 98 which is maintained by an unillustrated spring in engagement with the surface 97. Thus, the axial position of the pin 98 will at all times reflect the angular positions of the rings 92 and 93 and will influence the angular position of the light meter to automatically take into account the preselected aperture of the diaphragm.

The tube 96 carries the plate 1''' of the diaphragm assembly and forms a bearing for the rotary diaphragm ring 9'''. This diaphragm ring 9''' is fixed with an axially extending pin 102 which extends through an elongated arcuate cutout 101 which extends along part of a cylinder whose axis coincides with the optical axis so that the pin 102 while extending axially in the manner shown in FIG. 5 is also free to turn through the necessary range with the ring 9''' about the optical axis while remaining parallel thereto. This pin 102 is connected through an unillustrated well-known transmission with the scanning structure of the automatic light-responsive structure so that when the camera is operated automatically the light-responsive structure will operate automatically to turn the pin 102 and thus the ring 9''' for actuating the diaphragm.

In order to be able to read the adjustments of the rings 92 and 93, an extension of the ring 92 is formed with the windows 103 and 104, as indicated above, and through the window 103 (FIG. 6) there are visible, according to the angular position of the ring 92, graduations of one scale of distances between the subject and the camera, and this scale is carried by the stationary carrier 91 beneath the window 103, as is apparent from FIG. 5. The ring 93 has a portion extending beneath the window 104 and carrying the second scale of distances between the subject and the camera, so that the graduations of the latter scale are selectively visible in the window 104.

Figure 6:
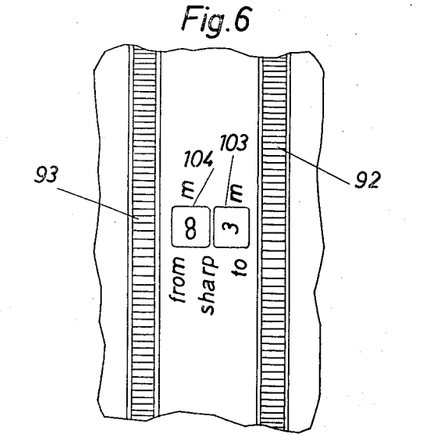
FIG. 6 is a fragmentary top plan view of the structure of FIG. 5 showing the arrangement of scales for indicating the depth of field.

In order to make an exposure with the structure of FIGS. 5 and 6, the operator first turns the ring 92 so as to provide one of the desired limits on the depth of field, such as, for example, that limit of the depth of field which is closest to the operator of the camera, and then the operator will turn the ring 93 so as to provide that limit of the desired depth of field which is furthest from the operator of the camera. Thus, by observing the graduations which appear in the windows 103 and 104 the operator can by turning the rings 92 and 93 provide selected limits on the depth of field he wishes to have in the photograph which will be made by the camera. Of course, when the operator turns the ring 93 so as to set one of the limits on the depth of field this ring 93 acts through the pin 105 on the diaphragm ring 13''' and through the threads 94 on the tube 96 to automatically set the aperture and the distance in accordance with the angular position of the ring 93. The manner in which the diaphragm is operated by the turning of the ring 13''' is such that the diaphragm will automatically be set by turning of the ring 93 at an aperture which will provide the depth of field for the distance set by the ring 92 and corrected by the ring 93 according to the range selected by the operator. Of course, the focal length of the objective is taken into account in providing the selected depth of field in combination with the setting of the diaphragm in this way.

The preselected size of the exposure aperture is transmitted through the cam 97 and the pin 98 to the light meter of the structure which automatically controls the exposure, and when this automatic light-responsive structure is released for operation, then the scanning element thereof will engage the pointer of the light meter and will through a well-known transmission set the exposure time. The arrangement is such that the exposure time is moved through its entire range before the automatic structure acts on the pin 102 to change the setting of the aperture throuh the ring 9'''. In the event that there is so much light available that after the exposure time has moved through its entire range from its longest to its shortest exposure time, it is still necessary to reduce the amount of light which will reach the film, then of course the automatic structure will act through the pin 102 on the ring 9''' to alter the setting of the diaphragm beyond that which has been preselected so that a proper exposure will be made. The arrangement is such that in the rest position of the parts the largest aperture and the longest exposure time are provided, so that when the diaphraghm is actuated in this way beyond the preselection made by the operator the size of the exposure will be reduced.

It will be understood that each of the elements described above, or two or more together, may also find a useful application in other types of cameras differing from the types described above.

While the invention has been illustrated and described as embodied in diaphragms for cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a pair of rotary diaphragm rings and a plurality of diaphragm blades therebetween; and a pair of pin-and-slot connections connecting each blade to said rings and the slots of said pin-and-slot connections respectively having different configurations providing one type of movement of said blades when one of said rings turns with respect to the other and another type of movement of said blades when the other of said rings turns with respect to said one ring, the pins of the pin-and-slot connections providing when one of said rings turns a plurality of pivot axes for said blades, respectively, with respect to the other ring and when said other ring turns a plurality of pivot axes for said blades, respectively, with respect to said one ring; a plurality of levers respectively connected to the pins of the pin-and-slot connections of said blades to one of said rings; and means supporting said levers for rotary movement about stationary axes, respectively, which are parallel to each other and to the common axis of the rotary diaphragm rings.

2. In a camera as recited in claim 1, said rings being coaxial and each of said blades carrying a pair of pins of said pin-and-slot connections and said rings respectively formed with slots of said pin-and-slot connections receiving said pins; automatic means operatively connected to one of said rings for turning the latter with respect to the other ring during automatic operation of the camera; a scale of flash guide numbers by said other ring; a focusing ring; and a means for coupling said other ring to said focussing ring for rotary movement therewith during exposure by flash illumination.

3. In a camera as recited in claim 1, each blade carrying a pair of pins of said pin-and-slot connections and said rings being respectively formed with slots of said pin-and-slot connections receiving said pins, manually operable means cooperating with one of said rings for turning the latter with respect to the other when said manually operable means is actuated by the operator, said manually operable means setting into the camera at least one limit of a preselected depth of field; and automatic means cooperating with the other of said rings for turning the latter automatically to control the exposure aperture of the camera.

4. In a camera as recited in claim 1, each blade carrying a pair of pins of said pin-and-slot connections and said rings being respectively formed with slots of said pin-and-slot connections receiving said pins; manually operable means cooperating with one of said rings for turning the latter with respect to the other when said manually operable means is actuated by the operator, said manually operable means setting into the camera at least one limit of a preselected depth of field; exposure time setting means, and automatic means cooperating with said exposure time setting means and the other of said rings for turning first the exposure time setting means and then the other of said rings automatically to control the exposure time and exposure aperture of the camera.

5. In a camera, in combination, a pair of rotary diaphragm rings and a plurality of diaphragm blades therebetween; and a pair of pin-and-slot connections connecting each blade to said rings and the slots of said pin-and-slot connections respectively having different configurations providing one type of movement of said blades when one of said rings turns with respect to the other and another type of movement of said blades when the other of said rings turns with respect to said one ring, the pins of the pin-and-slot connections providing when one of said rings turns a plurality of pivot axes for said blades, respectively, with respect to the other ring and when said other ring turns a plurality of pivot axes for said blades, respectively, with respect to said one ring; a plurality of levers respectively connected to the pins of the pin-and-slot connections of said blades to one of said rings; and means supporting said levers for rotary movement about stationary axes, respectively, which are parallel to each other and to the common axis of the rotary diaphragm rings, the distance between the pins of the pin-and-slot connections of each ring being equal to the distance between the turning axis of each lever and the pin connected thereto.

6. In a camera, in combination, a pair of rotary diaphragm rings and a plurality of blades therebetween, said rings being formed, respectively, with a pair of control slots for each blade, and each blade carrying a pair of pins respectively located in said slots, the configurations of said pair of slots being respectively different and providing one type of movement of said blades when one of said rings turns with respect to the other and another type of movement of said blades when said other ring turns with respect to said one ring; a plurality of levers respectively connected to the pins of said blades which respectively extend through the slots of one of said rings; and means supporting said levers, respectively, for rotary movement about a plurality of axes which are parallel to each other and to the common axis of said rotary diaphragm rings.

7. In a camera, in combination, a pair of rotary diaphragm rings and a plurality of blades therebetween, said rings being formed, respectively, with a pair of control slots for each blade, and each blade carrying a pair of pins respectively located in said slots, the configurations of said pair of slots being respectively different and providing one type of movement of said blades when one of said rings turns with respect to the other and another type of movement of said blades when said other ring turns with respect to said one ring; a plurality of levers respectively connected to the pins of said blades which respectively extend through the slots of one of said rings; and means supporting said levers, respectively, for rotary movement about a plurality of axes which are parallel to each other and to the common axis of said rotary diaphragm rings, the distance between the turning axis of each lever and the pin connected thereto being equal to the distance said latter pin and the other pin which is connected to the blade which carries said latter pin.

8. In a camera, in combination, a stationary plate surrounding the optical axis and a pair of rotary diaphragm rings respectively located on opposite sides of said plate parallel thereto and having a common axis coinciding with the optical axis, and a plurality of diaphragm blades located between one of said rings and said plate, each diaphragm blade carrying a pair of pins and said rings being respectively formed with slots receiving said pins, the slots of one ring providing one type of movement of said blades when said one ring turns with respect to the other and the slots of said other ring having a configuration defferent from the slots of said one ring and providing another type of movement of said blades when said other ring turns with respect to said one ring, said plate being formed with arcuate slots through which the pins of said blades respectively extend into the slots of the ring on the other side of said plate from said blades, and a plurality of levers turnably carried by said plate for respective turning movement about axes in the centers of curvature of said arcuate slots, respectively, and said levers being respectively connected to said pins which extend through said arcuate slots of said plate, the turning axis of each lever being spaced from the pin connected thereto by a distance equal to the distance between said latter pin and the pin which is connected to the same blade but extends into the slot of the other ring.

9. In a camera, in combination, a pair of coaxial rotary diaphragm rings and a plurality of diaphragm blades therebetween, each blade carrying a pair of pins and said rings being respectively formed with slots receiving said pins and having curvatures providing one type of blade movement when one of said rings turns with respect to the other and another type of blade movement when said other ring turns with respect to said one ring; automatic means operatively connected to one of said rings for turning the latter automatically in accordance with the lighting conditions for setting the exposure aperture automatically; exposure time setting means operatively connected to said one ring for turning movement with the latter when said one ring is turned by said automatic means so that the exposure time is also capable of being set automatically with the setting of the exposure aperture; manually operable diaphragm-setting means operatively connected to the other of said diaphragm rings for turning the latter with respect to said one ring which is capable of being turned by said automatic means for setting the exposure aperture manually; manually operable exposure time setting means; and totalizing transmission means operatively connected to said manually operable exposure time setting means and said manually operable diaphragm setting means for totalizing the settings thereof to provide an indication which may be used by the operator in the setting of the camera.

References Cited by the Examiner

UNITED STATES PATENTS

| | | | |
|---|---|---|---|
| 2,549,230 | 4/51 | Parody | 95—64 |
| 2,911,897 | 11/59 | Fahl | 95—64 |
| 2,925,765 | 2/60 | Gebele | 95—64 |
| 2,981,163 | 4/61 | Sommer et al. | 95—64 X |
| 2,996,968 | 8/61 | Lunzer | 95—64 |
| 3,040,643 | 6/62 | Rentschler | 95—64 |

NORTON ANSHER, *Primary Examiner.*

DELBERT B. LOWE, *Examiner.*